United States Patent
Hunt et al.

(10) Patent No.: US 12,341,811 B2
(45) Date of Patent: *Jun. 24, 2025

(54) DETECTING MALICIOUS BEHAVIOR USING AN ACCOMPLICE MODEL

(71) Applicant: Microsoft Technology Licensing, LLC, Redmond, WA (US)

(72) Inventors: Adam Hunt, El Cerrito, CA (US); Joseph Linn, Emeryville, CA (US); Nick Goodman, San Mateo, CA (US); Elias Manousos, San Francisco, CA (US); Chris Kiernan, San Francisco, CA (US); David Pon, Sunnyvale, CA (US); Jonas Edgeworth, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 567 days.

This patent is subject to a terminal disclaimer.

(21) Appl. No.: 17/486,731

(22) Filed: Sep. 27, 2021

(65) Prior Publication Data

US 2022/0014552 A1  Jan. 13, 2022

Related U.S. Application Data

(63) Continuation of application No. 16/709,898, filed on Dec. 10, 2019, now Pat. No. 11,134,101, which is a
(Continued)

(51) Int. Cl.
*H04L 9/40* (2022.01)
*G06F 16/2457* (2019.01)
(Continued)

(52) U.S. Cl.
CPC .... *H04L 63/1483* (2013.01); *G06F 16/24578* (2019.01); *G06F 16/951* (2019.01);
(Continued)

(58) Field of Classification Search
None
See application file for complete search history.

(56) References Cited

U.S. PATENT DOCUMENTS 8,468,597 B1 *  6/2013  Warner ................. H04L 51/212
709/225
8,826,426 B1 *  9/2014  Dubey ................ H04L 63/1433
726/25

(Continued)

*Primary Examiner* — Khang Do
(74) *Attorney, Agent, or Firm* — Wade IP Law PLLC

(57) ABSTRACT

The present disclosure generally relates to web page analysis, and more particularly to detecting malicious behavior using an accomplice model. In certain embodiments, the accomplice model may determine that a URI is associated with malicious behavior based upon the URI being associated with an attribute determined to be related to malicious behavior. Examples of an attribute include a host system, a domain, or an element of a document used to render the web page. Examples of an element of a document used to render the web page may include an active/dynamic element (e.g., a function, a script, etc.) or an inactive/static element (e.g., a string, a number, a frame, a tracking username, a social networking username, etc.).

20 Claims, 4 Drawing Sheets

Related U.S. Application Data continuation of application No. 15/803,736, filed on Nov. 3, 2017, now Pat. No. 10,505,981.

(60) Provisional application No. 62/417,228, filed on Nov. 3, 2016.

(51) Int. Cl.
*G06F 16/951* (2019.01)
*G06F 16/955* (2019.01)
*G06F 21/56* (2013.01)
*H04L 67/02* (2022.01)
*H04L 67/306* (2022.01)

(52) U.S. Cl.
CPC ........ *G06F 16/955* (2019.01); *H04L 63/0236* (2013.01); *H04L 63/101* (2013.01); *G06F 21/56* (2013.01); *H04L 63/14* (2013.01); *H04L 63/1433* (2013.01); *H04L 63/1441* (2013.01); *H04L 63/168* (2013.01); *H04L 67/02* (2013.01); *H04L 67/306* (2013.01)

(56) References Cited

U.S. PATENT DOCUMENTS

| | | | | |
|---|---|---|---|---|
| 8,850,567 | B1* | 9/2014 | Hsieh | G06F 21/552 726/22 |
| 9,413,774 | B1* | 8/2016 | Liu | G06F 21/566 |
| 9,838,407 | B1* | 12/2017 | Oprea | H04L 63/1416 |
| 10,057,279 | B1* | 8/2018 | Balduzzi | H04L 63/145 |
| 2005/0086206 | A1* | 4/2005 | Balasubramanian | G06F 16/951 |
| 2006/0075494 | A1* | 4/2006 | Bertman | G06F 21/566 726/22 |
| 2007/0078936 | A1* | 4/2007 | Quinlan | G06Q 10/107 709/206 |
| 2008/0010683 | A1* | 1/2008 | Baddour | G06F 16/951 713/188 |
| 2008/0082662 | A1* | 4/2008 | Dandliker | H04L 63/10 709/225 |
| 2008/0133540 | A1* | 6/2008 | Hubbard | H04L 63/145 |
| 2008/0256622 | A1* | 10/2008 | Neystadt | H04L 63/1416 726/14 |
| 2008/0301116 | A1* | 12/2008 | Wang | G06F 16/951 707/999.005 |
| 2009/0012946 | A1* | 1/2009 | Tsunokawa | G06F 16/951 |
| 2009/0182818 | A1* | 7/2009 | Krywaniuk | H04L 51/212 709/206 |
| 2009/0300768 | A1* | 12/2009 | Krishnamurthy | H04L 63/1483 726/26 |
| 2010/0235915 | A1* | 9/2010 | Memon | H04L 63/145 709/224 |
| 2010/0251371 | A1* | 9/2010 | Brown | G06F 21/554 726/23 |
| 2011/0078309 | A1* | 3/2011 | Bloch | H04L 63/168 709/224 |
| 2011/0271329 | A1* | 11/2011 | Hulten | H04L 67/306 726/4 |
| 2011/0289582 | A1* | 11/2011 | Kejriwal | H04L 63/14 726/22 |
| 2012/0072407 | A1* | 3/2012 | Shyamsunder | G06F 16/951 707/E17.107 |
| 2012/0101808 | A1* | 4/2012 | Duong-Van | G06F 40/30 704/9 |
| 2012/0102545 | A1* | 4/2012 | Carter, III | G06F 21/51 707/769 |
| 2012/0317642 | A1* | 12/2012 | Royal | H04L 63/1433 726/22 |
| 2013/0179421 | A1* | 7/2013 | Jeong | G06F 16/9558 707/706 |
| 2014/0283078 | A1* | 9/2014 | Redfoot | H04L 63/0245 726/23 |
| 2014/0337973 | A1* | 11/2014 | Foster | H04L 63/1441 726/22 |
| 2015/0007312 | A1* | 1/2015 | Pidathala | H04L 63/1433 726/22 |
| 2015/0172311 | A1* | 6/2015 | Freedman | H04L 63/20 726/1 |
| 2015/0244728 | A1* | 8/2015 | Tao | H04L 63/1483 726/23 |
| 2015/0244738 | A1* | 8/2015 | Lu | G06F 21/56 726/23 |
| 2015/0339580 | A1* | 11/2015 | Riabov | G16H 50/70 706/46 |
| 2015/0350232 | A1* | 12/2015 | Liu | H04L 63/1433 726/23 |
| 2016/0036833 | A1* | 2/2016 | Ardeli | H04L 63/101 726/22 |
| 2016/0380977 | A1* | 12/2016 | Bean | G06F 21/566 726/12 |
| 2017/0104782 | A1* | 4/2017 | Folco | H04L 63/1433 |
| 2017/0149821 | A1* | 5/2017 | Li | H04L 63/101 |
| 2017/0195353 | A1* | 7/2017 | Taylor | H04L 63/1425 |
| 2017/0353434 | A1* | 12/2017 | Al-Saber | H04L 63/168 |

* cited by examiner

FIG. 3

DETECTING MALICIOUS BEHAVIOR USING AN ACCOMPLICE MODEL

CROSS-REFERENCES TO RELATED APPLICATIONS

This application is a continuation of U.S. patent application Ser. No. 16/709,898, entitled "TECHNIQUES FOR DETECTING MALICIOUS BEHAVIOR USING AN ACCOMPLICE MODEL," filed Dec. 10, 2019, which is a continuation of U.S. patent application Ser. No. 15/803,736 (now U.S. Pat. No. 10,505,981), entitled "TECHNIQUES FOR DETECTING MALICIOUS BEHAVIOR USING AN ACCOMPLICE MODEL," filed Nov. 3, 2017, which claims the benefit of U.S. Provisional Application No. 62/417,228, entitled "EXTRACTING UNIFORM RESOURCE LOCATOR (URL) REPUTATION FROM BLACKLIST SEQUENCES," filed Nov. 3, 2016, all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

BACKGROUND

As the Internet becomes more widespread, new features are constantly being added to increase communication between systems. However, these new features are often hidden from the view of users. For example, rendering a web page of a website within a domain may include (1) a request for a resource from a different domain, (2) executing a script (e.g., JavaScript) in the web page that causes a communication to be sent to a different domain, and/or (3) a redirection to a different web page hosted on a different domain. As a result, a final state of a web page is often what is deemed as malicious. However, identifying the final state of the web page as malicious may miss a source of the malicious behavior when there is a different web page that is used by several web pages during rendering, the different web page being the true source of the malicious behavior. Therefore, there is a need in the art to detect sources of malicious behavior.

SUMMARY

The present disclosure generally relates to web page analysis, and more particularly to detecting malicious behavior using an accomplice model.

In certain embodiments, the accomplice model may determine that a URI is associated with malicious based upon the URI being associated with an attribute determined to be related to malicious behavior. Examples of an attribute include a host system, a domain, or an element of a document used to render the web page. Examples of an element of a document used to render the web page may include an active/dynamic element (e.g., a function, a script, etc.) or an inactive/static element (e.g., a string, a number, a frame, a tracking username, a social networking username, etc.).

In some embodiments, the accomplice model may cause a web crawl to be initiated. During the web crawl, a URI corresponding to a web page may be identified. The URI may then be used to obtain a document to render the web page. The document (e.g., an HTML document) may include one or more instructions that cause a web page to be rendered. To render the web page, the document may be parsed, causing one or more additional URIs to be called during the rendering process. At some point during or after the document is parsed, the web page may be determined to be malicious. In response to the web page being determined to be malicious, each URI that was called to render the web page may be added to a blacklist sequence (sometimes referred to as a list). Accordingly, the blacklist sequence may include multiple URIs used to render the malicious web page.

The process described above regarding the web crawl may be performed multiple times, with different web crawls beginning at the same URI or different URIs. Thus, multiple blacklist sequences may be generated for the same or different sequences of URI that were called that resulted in a malicious URI being called. Comparing the multiple blacklist sequences, an attribute may be identified that is reoccurring in a URI among the multiple blacklist sequences.

Based upon a number of times the attribute reoccurs in at least one URI in different blacklist sequences, a score may be generated for the attribute. The score may indicate a likelihood that the attribute is associated with malicious behavior. In some examples, the score may be further based upon a number of times that a web crawl causes a URI with the attribute to be called without the web crawl resulting in the generation of a blacklist sequence (i.e., none of the URIs called during the web crawl were identified as malicious). In such examples, the score may be generated based upon a Wilson score interval to prevent attributes from being identified as malicious the first few times that they are identified in a blacklist sequence (e.g., that there is statistical support that the attribute is more often bad than not). In some examples, the score may be further based upon an amount of time since a web crawl that included a URI with the attribute resulted in the generation of a blacklist sequence. In such examples, the amount of time may be temporal or based upon a number of web crawls run.

The score may be compared to a threshold that indicates whether the attribute is malicious. When the attribute is determined to be malicious, a URI in the blacklist sequence may be determined to be malicious and output. Output of the URI may be to a user to inform the user that the URI is malicious. In some examples, output of the URI may be to a system that either removes code that causes the URI to be called or, if the attribute is an element of a document used to render a web page, the attribute may be removed from the document. The URI that is determined to be malicious may be referred to as a malicious redirector.

In one illustrative example, a web page may include multiple frames, each frame with content from a different host. In such an example, the content from each different host may be associated with a web page and be determined to be malicious. Embodiments described above may identify the web page as being associated with malicious behavior even though it is actually the frames that are malicious. Therefore, such embodiments allow the diagnosis of web pages, hosts, and domains that are upstream from a malicious actor to be identified as associated with malicious behavior.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments of the present disclosure are described in detail below with reference to the following drawing figures.

FIG. 3 is an example of a user interface for displaying a blacklist sequence according to certain embodiments.

DETAILED DESCRIPTION

Figure 1:
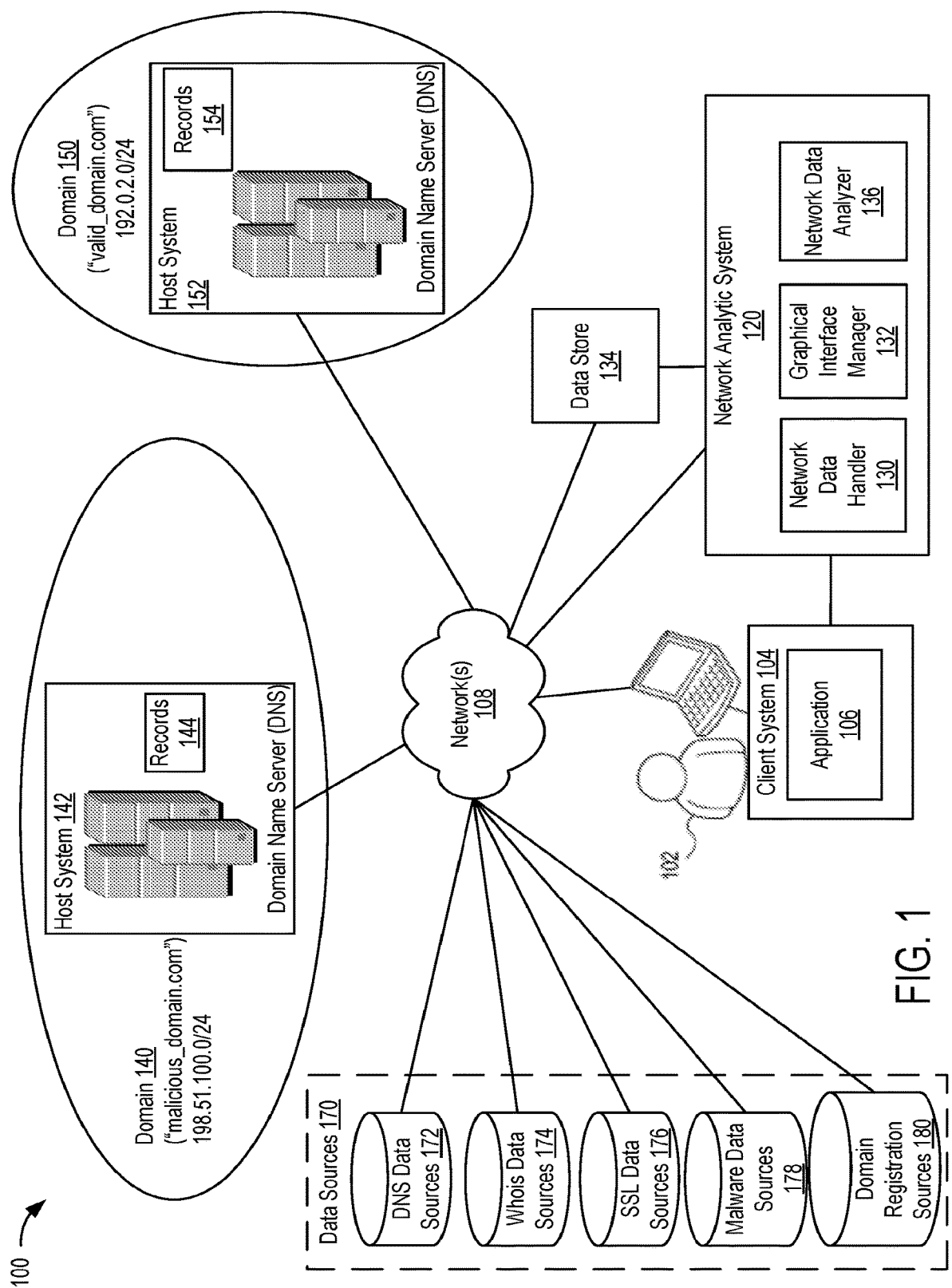
FIG. 1 is a high-level block diagram illustrating a network analytic system according to an embodiment.

The present disclosure generally relates to web page analysis, and more particularly to detecting malicious behavior using an accomplice model.

In certain embodiments, the accomplice model may determine that a URI is associated with malicious based upon the URI being associated with an attribute determined to be related to malicious behavior. Examples of an attribute include a host system, a domain, or an element of a document used to render the web page. Examples of an element of a document used to render the web page may include an active/dynamic element (e.g., a function, a script, etc.) or an inactive/static element (e.g., a string, a number, a frame, a tracking username, a social networking username, etc.).

In some embodiments, the accomplice model may cause a web crawl to be initiated. During the web crawl, a URI corresponding to a web page may be identified. The URI may then be used to obtain a document to render the web page. The document (e.g., an HTML document) may include one or more instructions that cause a web page to be rendered. To render the web page, the document may be parsed, causing one or more additional URIs to be called during the rendering process. At some point during or after the document is parsed, the web page may be determined to be malicious. In response to the web page being determined to be malicious, each URI that was called to render the web page may be added to a blacklist sequence (sometimes referred to as a list). Accordingly, the blacklist sequence may include multiple URIs used to render the malicious web page.

The process described above regarding the web crawl may be performed multiple times, with different web crawls beginning at the same URI or different URIs. Thus, multiple blacklist sequences may be generated for the same or different sequences of URI that were called that resulted in a malicious URI being called. Comparing the multiple blacklist sequences, an attribute may be identified that is reoccurring in a URI among the multiple blacklist sequences.

Based upon a number of times the attribute reoccurs in at least one URI in different blacklist sequences, a score may be generated for the attribute. The score may indicate a likelihood that the attribute is associated with malicious behavior. In some examples, the score may be further based upon a number of times that a web crawl causes a URI with the attribute to be called without the web crawl resulting in the generation of a blacklist sequence (i.e., none of the URIs called during the web crawl were identified as malicious). In such examples, the score may be generated based upon a Wilson score interval to prevent attributes from being identified as malicious the first few times that they are identified in a blacklist sequence (e.g., that there is statistical support that the attribute is more often bad than not). In some examples, the score may be further based upon an amount of time since a web crawl that included a URI with the attribute resulted in the generation of a blacklist sequence. In such examples, the amount of time may be temporal or based upon a number of web crawls run.

The score may be compared to a threshold that indicates whether the attribute is malicious. When the attribute is determined to be malicious, a URI in the blacklist sequence may be determined to be malicious and output. Output of the URI may be to a user to inform the user that the URI is malicious. In some examples, output of the URI may be to a system that either removes code that causes the URI to be called or, if the attribute is an element of a document used to render a web page, the attribute may be removed from the document. The URI that is determined to be malicious may be referred to as a malicious redirector.

In one illustrative example, a web page may include multiple frames, each frame with content from a different host. In such an example, the content from each different host may be associated with a web page and be determined to be malicious. Embodiments described above may identify the web page as being associated with malicious behavior even though it is actually the frames that are malicious. Therefore, such embodiments allow the diagnosis of web pages, hosts, and domains that are upstream from a malicious actor to be identified as associated with malicious behavior.

An accomplice list may be a statistical model that assigns a reputation score to URLs, hosts, domains and attributes commonly associated with malicious content or behavior. When there are multiple one-time-use hosts redirecting to a malicious page in the blacklist sequence chain, the accomplice list has the ability to identify these indirect connections. It works by examining all the URLs in a blacklist sequence looking for the reoccurrence of indicators anywhere in the chain. The model compares the number of times a host or domain appears in a blacklist sequence where the blacklist resource has exact "correlation type" to the number of times we've crawled that host and assigns a score to the URL. In some examples, the reputation score isn't a simple ratio of these two numbers. In such examples, a lower bound of the Wilson Score confidence interval may be used to provide a conservative estimate of the probability that the URL is malicious. An exponential decay factor may also be multiplied to the lower confidence interval based on the last time the host or domain was blacklisted and the last time we crawled it. The decay half life we have selected is 7 days. If the difference between the last time the host was crawled and the last time it generated a blacklist incident was 7 days, the score assigned to the URL is half of what it would be had the host been blacklisted the last time it was crawled. If the URL under examination has an accomplice list reputation score of 15 or higher, the system will create a blacklist incident. The accomplice list may also be segmented by known profile based on the known profile of the original blacklist incidents. This may include malware, phishing, spam and scam. When a host or domain is found on the accomplice list, a blacklist item may be created on the appropriate blacklist. This allows users to filter out known profile types for which they are not interested or do not apply. The accomplice list can provide an overall score in the cases where the host has been implicated in a number of threat types. This score overall score is not used if it equal to the more specific known profile score. Host and domain reputation may be available. Additional ability includes to detect malicious addresses, tracking IDs and social media profile usernames. By using the probability a URL should be blacklisted given the hostname and the probability of the hostname given an attribute, the hostname may be marginalized to estimate the number of times an attribute appeared in a blacklist sequence. In order to be as accurate as possible, the calculation also may include the time interval when the host was blacklisted and the time interval when we detected that attribute on the host overlap. Model may include headers, cookies, web components and other indicators in addition to tacking IDS and social media profile usernames. Even if the page being examined has multiple indicators (e.g. host, domain, address and attributes), the model may provide one score per known profile. In other examples, a Bayesian network model that can take into account multiple indicators at the same time may be used. The Bayesian network model may include probability tables that can learned using a variety of Machine learning algorithms or entered in manually. The process that calculates the reputation scores may be performed once per day.

I. Exemplary Distributed System

FIG. 1 is a simplified block diagram of distributed system 100 according to certain embodiments. Distributed system 100 is not intended to suggest any limitation as to scope of use or functionality of described embodiments.

Distributed system 100 may include one or more client systems 104 (referred to herein as "client system" or "client") and network analytic system 120. Network analytic system 120 may be implemented by a computing system. Client system 104 may be operated by one or more users (e.g., user 102), such as a network analyst whose role it is to assess network activity and to determine possible malicious events related to the network activity.

Client system 104 may present a user interface (e.g., a graphical user interface or a command prompt), or a combination thereof to a user. The user interface may be generated by client system 104, received from network analytic system 120, or a combination thereof. The user interface may be updated or modified by client system 104 or network analytic system 120 in response to one or more interactions by the user with the user interface.

Figure 3:
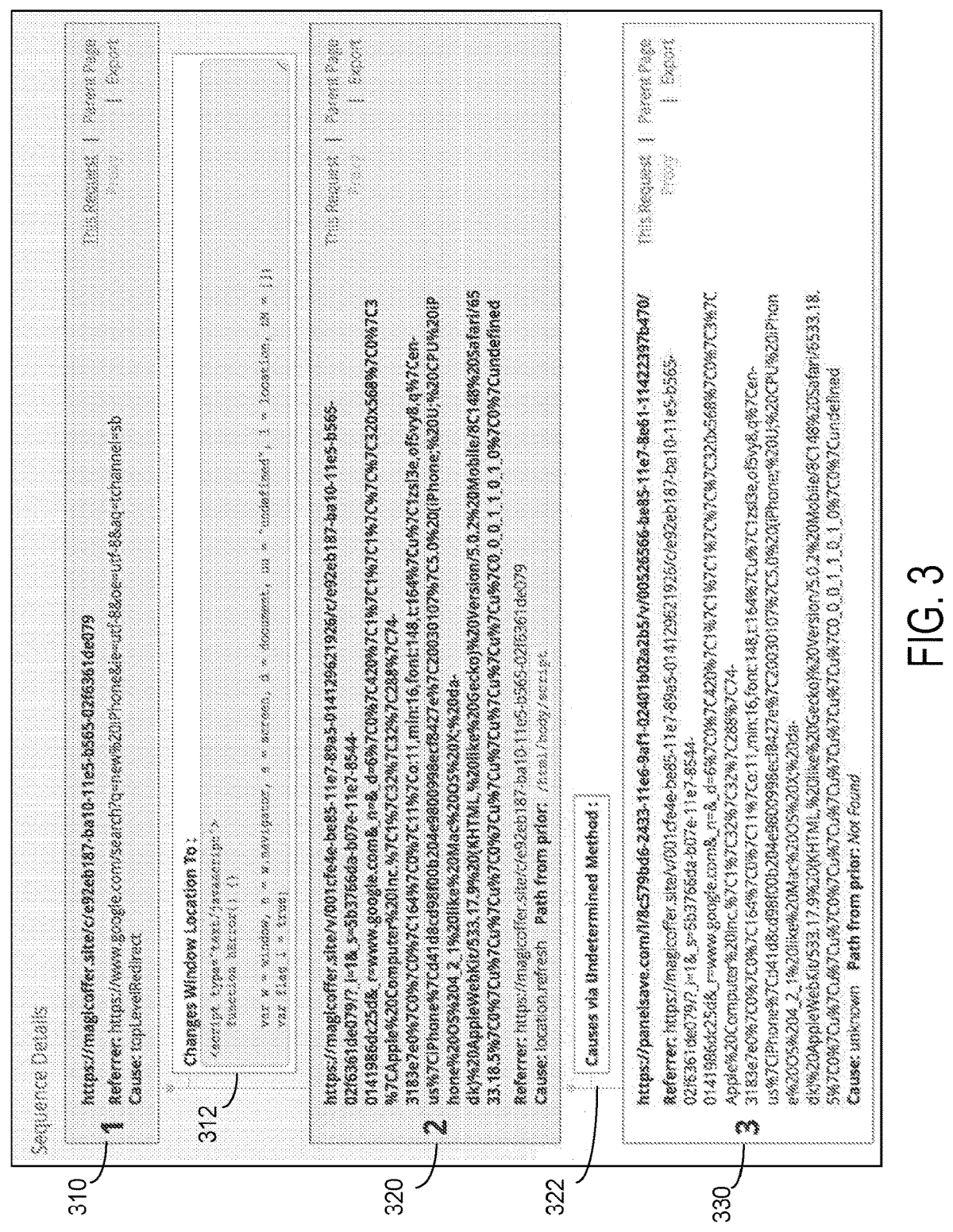
Figure 4:
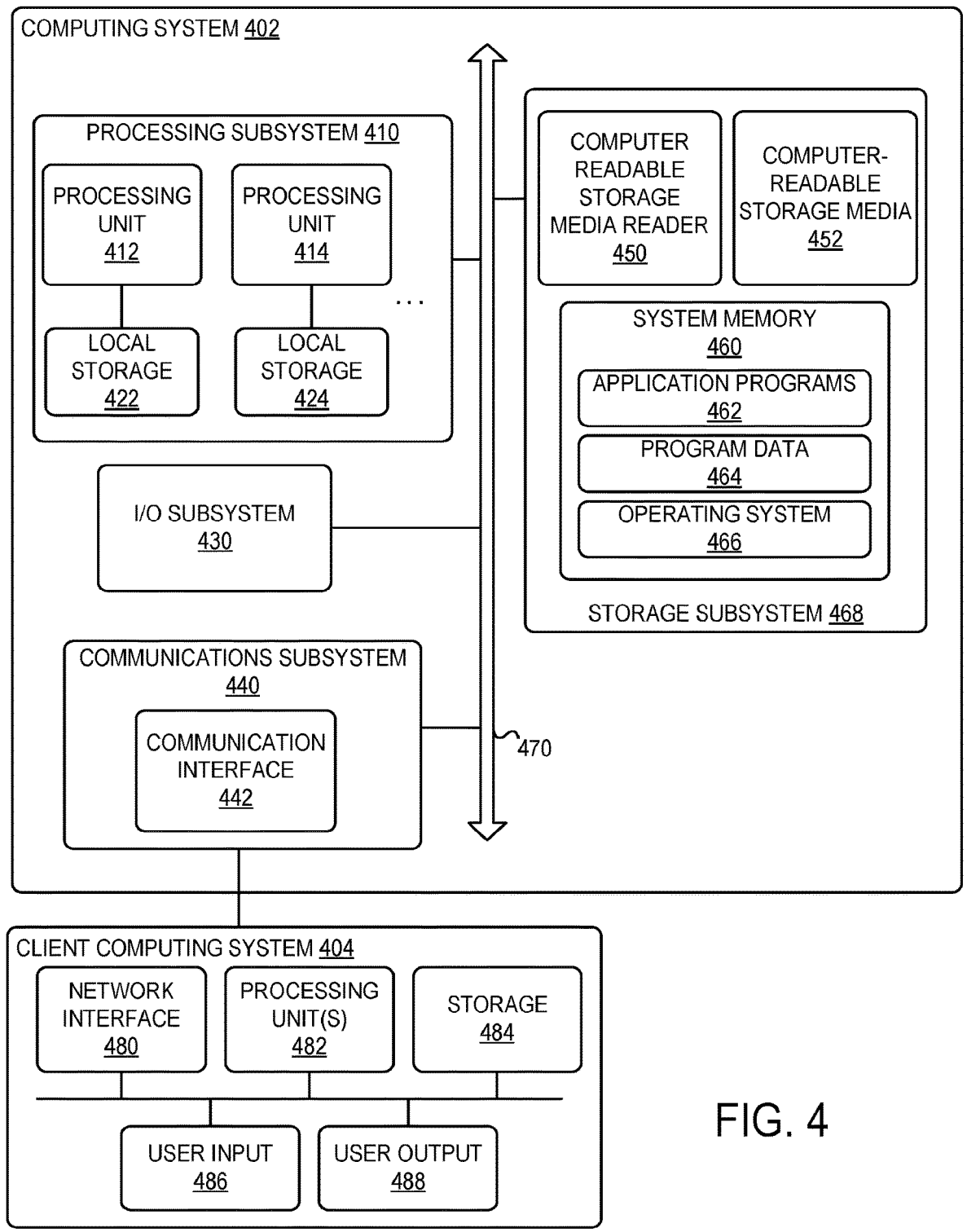
FIG. 4 is a simplified block diagram of a computing system and a client computing system usable to implement some embodiments.

The user interface may be provided by network analytic system 120 via network 108 as part of a service (e.g., a cloud service) or application. For example, network analytic system 120 may expose an application programming interface (API) such that the API may be used as the user interface. For another example, a graphical user interface, such as illustrated in FIGS. 3 and 4, may be provided. In some embodiments, client system 104 may provide access to one or more applications 106 ("app"). App 106 may enable a user to access and perform services provided by network analytic system 120.

Client system 104 and network analytic system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Network analytic system 120 may be implemented using a computer system (such as illustrated in FIG. 5), which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analytic system 120 may run any operating system or a variety of additional server applications and/or mid-tier applications, including HTTP servers, FTP servers, CGI servers, Java servers, database servers, and the like. Exemplary database servers include without limitation those commercially available from Microsoft, and the like. In one example, network analytic system 120 may be included in or implemented with a product provided by RiskIQ® Corporation. In some embodiments, network analytic system 120 may be implemented with or included in any of the systems incorporated by reference, such as the systems described in a patent or patent application referenced in this disclosure. In various embodiments, network analytic system 120 may be configured to run one or more services or software applications described in the foregoing disclosure. Network analytic system 120 may correspond to a computing system for performing processing as disclosed herein according to an embodiment of the present disclosure.

In some embodiments, network analytic system 120 may be implemented as an enterprise computing system or a cloud computing system comprising one or more computers and/or servers that may include those described above. Network analytic system 120 may include several subsystems and/or modules, including some, which may not be shown. For example, network analytic system 120 may include network data handler 130, graphical interface manager 132, and network data analyzer 136. Network analytic system 120 may have more or fewer subsystems and/or modules than shown in the figure, may combine two or more subsystems and/or modules, or may have a different configuration or arrangement of subsystems and/or modules. Subsystems and modules of network analytic system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analytic system 120 may also provide other services or software applications may include non-virtual and virtual environments. In some embodiments, these services may be offered as web-based or cloud services or under Software as a Service (SaaS) model to the users of client system 104. The services offered by network analytic system 120 may include application services. Application services may be provided by network analytic system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers may utilize applications executing in network analytic system 120, which may be implemented as a cloud infrastructure system. Users may acquire the application services without the need for customers to purchase separate licenses and support. Various different SaaS services may be provided. Users operating client system 104 may in turn utilize one or more applications to interact with network analytic system 120 to utilize the services provided by subsystems and/or modules of network analytic system 120.

Network analytic system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory in network analytic system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Distributed system 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, distributed system 100 may be coupled to or may include one or more data sources, such as DNS data sources 172, WHOIS data sources 174, SSL data sources 176, malware data sources 178, and domain registration data sources 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analytic system 120 using network 108.

Distributed system 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, distributed system 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analytic system 120 using network 108.

Distributed system 100 may include one or more network domains (e.g., an Internet domain), such as domain 140 and domain 150. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to implement a DNS for domain 140. Domain 140 and domain 150 may be mapped (e.g., via DNS) to one or more IP addresses. Domain 150 may include a host computing system 152. Host computing system 152 may store records 154 to implement a DNS for domain 150. Domain 140 may be communicatively connected to network 108 via an access network. Domain 150 may be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). A host or host system as referred to herein may include one or more domains, and one or more IP addresses associated with each domain. As used herein, a host may include general purpose computers, as well as other devices, that have an IP address.

Distributed system 100 may implement one or more techniques for identifying attributes and/or URIs as associated with malicious behavior, as described further below. The techniques may be useful for tracking and analyzing network infrastructure for network-based assets. Such assets may be owned or associated with an entity (e.g., a company or network domain). Examples of network-based assets include, without restriction, domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

Individual embodiments may be described as a process which may be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analytic system 120 may implement the processes disclosed herein. Any of the processes may be implemented as a service to a user of network analytic system 120.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

The one or more techniques for determining relationships between network-based assets for network infrastructure analysis. The techniques may be useful for tracking and analysis of network infrastructure for network-based digital assets. Such assets may be owned or associated with an entity (e.g., a company or network domain). Examples of network-based digital assets include, without restriction, domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

The one or more techniques may include determining a configuration for each of one or more crawl processes to gather data about network-based assets. The process may include receiving a crawl configuration via one or more interfaces. The interfaces may be generated by graphical interface manager 132 and provided to a client system for presentation. One or more crawl processes may be determined based on the crawl configuration(s). Crawl processes may be generated using one or more instructions (e.g., code or script). Crawl processes may be implemented to search networks, e.g., the Internet, for network-based assets according to a crawl configuration. In some embodiments, a crawl process may be implemented starting with one or more network-based assets as a source (e.g., a target network-based asset) from which to initiate a crawl process. The source may be chosen based on input by a user. The source as the basis for a crawl may be based on one or more network-based assets that are identified as being malicious, such as by techniques disclosed in U.S. Non-provisional application Ser. No. 14/938,802 entitled "IDENTIFYING PHISHING WEB SITES USING DOM CHARACTERISTICS" and filed on Nov. 11, 2015, in U.S. Non-provisional application Ser. No. 14/938,814 entitled "USING HASH SIGNATURES OF DOM OBJECTS TO IDENTIFY WEBSITE SIMILARITY" and filed on Nov. 11, 2015, and in U.S. Non-provisional application Ser. No. 15/787,654 entitled "HOST PAIR DETECTION" and filed on Oct. 18, 2017. Each of the above-identified applications are considered part of this disclosure and are incorporated herein by reference for all purposes.

The crawl processes may be implemented in or using a discovery and inventor process, such as for discovery and inventory system disclosed in U.S. Non-Provisional patent application Ser. No. 14/520,029 filed on Oct. 21, 2014 and entitled "SYSTEM AND METHOD FOR IDENTIFYING INTERNET-FACING ASSETS." The above-identified application is considered part of this disclosure and is incorporated herein by reference for all purposes. Network data handler 130 may implement processes to generate and/or identify network data. In some embodiments, the process may include network data handler 130 gathering data from data sources 170 corresponding to network-based assets identified during a crawl process. The crawl processes may be implemented according to a schedule that is part of the configuration. The crawl process is a dynamic process by which web pages of network-based assets are dynamically rendered at the time when the crawl process is implemented.

In at least one embodiment, a crawl process may be implemented using techniques for crawling one or more sources, such as a web page of a host. The crawl process may be implemented to traverse through a source, such as a web page to identify different network-based assets and the relationships between those assets. The crawl process may include executing a function in a document for rendering web pages, such as a redirect link, an image retrieval function, a script (e.g., JavaScript), or other function of a network-based asset. The crawl process may be configured to determine the extent to which relationships are identified and traversed. In some embodiments, a crawl process may be restricted so as to not overburden and/or notify a malicious network-based asset of crawling that might lead to detection of malicious behavior. A crawl process may include performing any of the techniques disclosed herein for crawling.

In some embodiments, a crawl process may include processing data of network-based assets and rendering elements of a web page for a network-based asset. Any function in a web page of a web site that is crawled may be rendered. Network-based assets may be identified to the extent defined by a crawl configuration. A web page may be rendered according to a model (e.g., a document object model). Active code and frames in a web page may be rendered. Redirects in a web page may be followed. Images and functions in a web page may be obtained or activated. The crawl process may monitor and log information about network-based assets identified in the crawl process. The data may be updated as crawl processes are scheduled to be repeated.

The process may include determining attributes, including, without restriction, frequency based on occurrence of a relationship, similarity between network-based assets that are identified as being related, the nature of the relationship (e.g., parent and child), a type of link (e.g., a cause of the relationship), any other information about a relationship between assets, similarity of neighbors that are related to an asset, or combinations thereof. The factors may be weighted based on the asset which is analyzed for relationships. The measure of a relationship may be based on one or more measures, such as a mean (e.g., a harmonic mean) of the factors and the weights assigned to each of those factors. The relationships between assets may be computed based on a request by a user with respect to any network-based asset. More weight may be applied to assets that have been previously identified as malicious. Information about previously identified malicious assets may be considered in determining a relationship using the crawl process.

The process may use graphical interface manager 132 to generate and provide interfaces to display information about classifications. The interfaces may be provided as part of an application. The application may be provided as a service or code to a client system. The interfaces may provide information about analysis of the web pages such as malicious behaviors and patterns. The malicious behavior may be presented as a suspect list or blacklists. The malicious behavior may be combined with other previously identified malicious behavior to provide a more comprehensive analysis of network security threats.

In at least one embodiment, a graphical interface may be provided to present a "heat map" displaying network data for a time period. The data in the heat map may be displayed according to techniques disclosed in U.S. Provisional Patent Application 62/274,741 and U.S. Provisional Patent Application 62/309,937, which are considered part of this disclosure and are incorporated herein by reference for all purposes. The graphical interface may include or enable access to a graphical interface ("Host Pairs") for displaying information about derived host pairs identified by network analytic system 120. The underlying network data displayed in the graphical interface of FIG. 3 may correspond to identified host pairs. The graphical interface may present information indicating a measure (e.g., a reputation score) of malicious network activity for resources identified as having a relationship of possible malicious activity. The graphical interface may be presented in addition to or along with the graphical interfaces in Appendix B. The resources may be identified as having a relationship based on one or more indicators (e.g. host, domain, address and attributes). The resources may be presented based on a relationship with one or more indicators, such as a network asset. For example, a graphical interface may be presented to show resources that are related and one or more measures of malicious network activity for those resources. The measure of malicious network activity may be generated as indicated with reference to FIG. 2. Resources may be displayed with a measure of malicious activity and one or more indicators based on which the measure is determined. In some embodiments, a heat map may be displayed that indicates the measure of malicious activity between related resources and the indicators corresponding to the measure.

Figure 2:
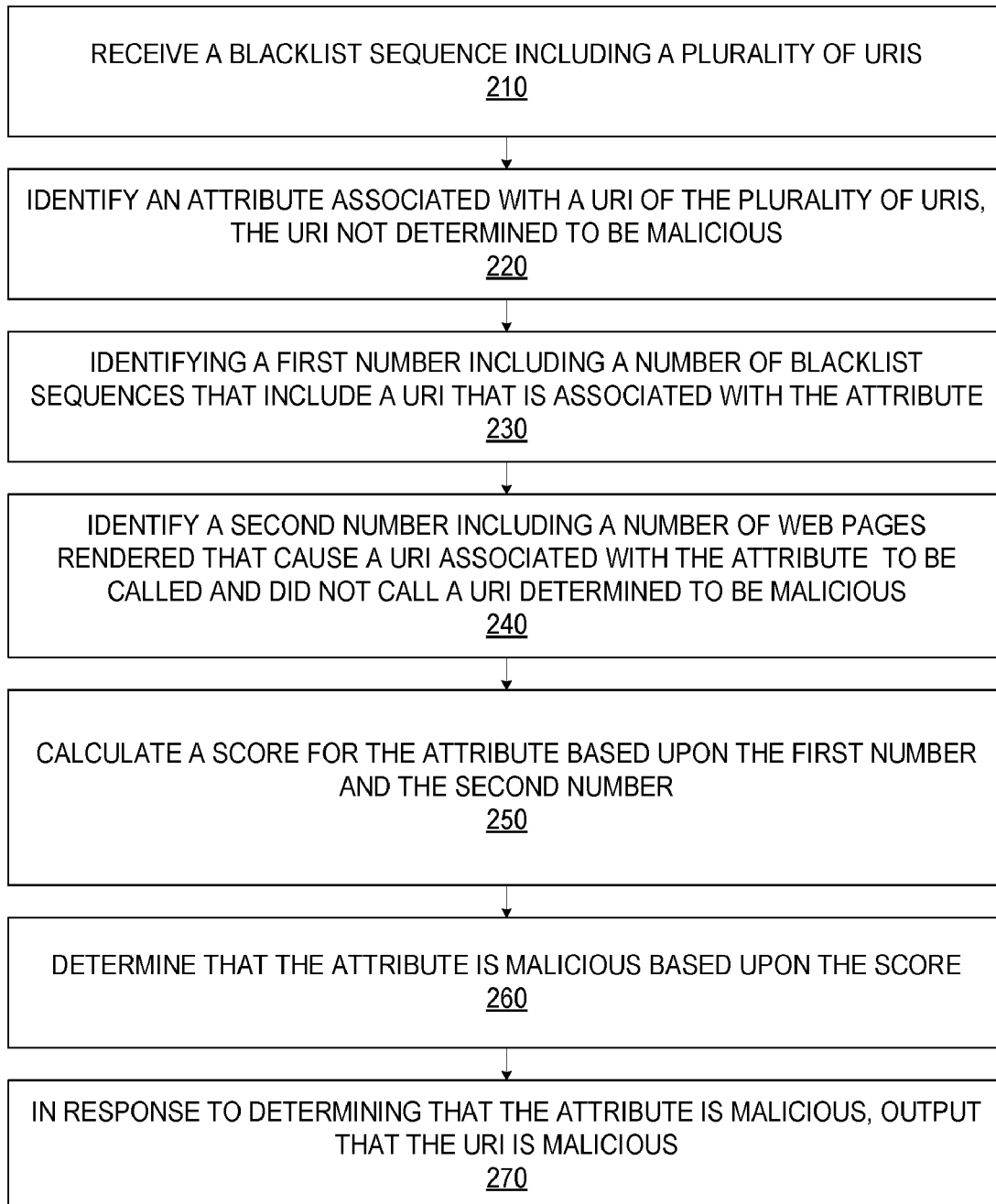
FIG. 2 illustrates a flowchart of a process for determining a measure of malicious activity according to some embodiments.

II. Processes for Determining a Measure of Malicious Activity of Network-Based Assets FIG. 2 illustrates a flowchart 200 of a process for determining a measure of malicious activity according to some embodiments. The process may be implemented by system 100. For example, a network analytic system (e.g., network analytic system 120 of FIG. 1) may perform processes for determining a measure of malicious activity. The techniques disclosed herein may be implemented in a system disclosed in U.S. Non-Provisional application Ser. No. 15/787,654 entitled "HOST PAIR DETECTION" and filed on Oct. 18, 2017. For example, the techniques disclosed herein may be implemented to determine a score indicating a relationship between network assets (e.g., a pair of hosts). The score may be used to derive a relationship between network assets based on web crawling.

The techniques disclosed herein can be modified by one skilled in the art to determine a relationship between any type of network-based assets. Individual embodiments may be described as a process which can be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analytic system 120 of FIG. 1 may implement the processes disclosed herein. Any of the processes may be implemented as a service to a user of network analytic system 120.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

Flowchart 200 may begin the process at 210 by receiving a list (sometimes referred to as a blacklist sequence) of Uniform Resource Identifiers (URIs) used to render a malicious web page. In one illustrative example, the blacklist sequence may be generated by a web crawler. The web crawler may receive a request to render a web page corresponding to a URI. The web crawler may retrieve a document for rendering the web page using the URI. The web crawler may then parse the document, causing one or more additional URIs to be called. At some point, the web page may be determined to be malicious (e.g., techniques disclosed in U.S. Non-Provisional application Ser. No. 15/625,877 entitled "USING HASH SIGNATURES OF DOM OBJECTS TO IDENTIFY WEBSITE SIMILARITY" and filed on Jun. 16, 2017, and techniques disclosed in U.S. Non-Provisional application Ser. No. 15/801,247 entitled "TECHNIQUES FOR CLASSIFYING A WEB PAGE BASED UPON FUNCTIONS USED TO RENDER THE WEB PAGE" and filed on Nov. 1, 2017; each of the above-identified applications are considered part of this disclosure and are incorporated herein by reference for all purposes). In response, the blacklist sequence may be generated to include each URI called while parsing the document (i.e. the URI and the one or more additional URIs).

In some examples, the blacklist sequence may be a set of resources that have been identified as malicious ("blacklisted") for possible malicious activity. The set of resources may include, without limitation, an electronic document, an application, a web page, a file, data, or combinations thereof. Each of the resources may be identified as a location, such as a uniform resource identifier (URI).

In some examples, the set of resources may be identified as part of a sequence of resources that are malicious by detecting malicious behavior with respect to the resource. For example, the set of resources may be URLs in a blacklist sequence of resources. Each in the set of resources may be detected as having malicious behavior at a web page accessible by the URL of the resource. In other examples, each in the set of resources may be detected as having malicious behavior based on reputation (e.g., a message from a system) provided by a provider of access to the resource. Each of the resources may be identified as malicious by identification of a relationship with other resources in the set. For example, the set of resources may be identified as being malicious based on a process implemented using techniques disclosed in U.S. Non-Provisional application Ser. No. 15/787,654 entitled "HOST PAIR DETECTION" and filed on Oct. 18, 2017. The set of resources may be identified as related to a network asset. For example, a host of each in the set of resources may be identified as having a relationship.

FIG. 3 is an example of a user interface for displaying a blacklist sequence according to certain embodiments. The blacklist sequence may include three URIs (e.g., first URI 310, second URI 320, and third URI 330). First URI 310 may be a URI that a web crawl began at (referred to as a URI in FIG. 2). Indication 312 indicates a function called while parsing a document for rendering a web page corresponding to first URI 310. Second URI 320 may be a URI that was called while parsing the document. Indication 322 indicates that a cause of third URI 330 being called is unknown. For example, third URI 330 may be a URI that was called while parsing either the document or another document for rendering a web page corresponding to second URI 320. Third URI 330 may be determined to be malicious. For example, a web page corresponding to third URI 330 may be determined to be malicious.

Referring back to FIG. 2, at 220, an attribute is identified that is associated with (1) a URI in the list (e.g., google analytics id, social media profile) or (2) the malicious web page (e.g., inline JavaScript that is executed in the web page). Examples of an attribute include a host, a domain, an Internet Protocol (IP) address, or an element included in a document used to render a web page. The element may be an active/dynamic element or a non-active/static element. An example of an element include a function, a tracking ID, or a social media profile username. In the example depicted in FIG. 3, the attribute may be first URI 310, a host system that hosts first URI 310, a domain of first URI 310, a referrer of first URI 310, a cause of first URI 310, the function depicted in indication 312, an output of the function, any code included in the function, second URI 320, a host system that hosts second URI 320, a domain of second URI 320, a referrer of second URI 320, a cause of second URI 320, a path from prior for second URI 320, third URI 330, a host system that hosts third URI 330, a domain of third URI 330, a referrer of third URI 330, a cause of third URI 330, a path from prior for third URI 330, any combination described above, including an order of any combination.

In some examples, the attribute may create its own pairing. For example, the pairing may include the attribute paired with a network-based asset. Examples of pairings include: "Google analytic id, malicious host," "Social profile, malicious host," and "Top level host for webpage, malicious host." If a pairing is found in multiple blacklist sequences, At 230, a metric is determined based upon whether the attribute is associated with one or more other lists of URIs. For example, the metric may a number of the one or more other lists including at least one URI that is associated with the attribute. For another example, the metric may include a time since the attribute has been associated with a most recent list of the one or more lists (e.g., how recently the attributes has been associated with a malicious behavior). For another example the metric may be a number of times that a malicious URI has been crawled. For another example, the metric may include number of distinct host pairs that the URI/resource has been observed in, where a host pair is a statistical combination of any two resources in a crawl sequence. It should be recognized that one or more metric examples described herein may be combined into a single metric or used as separate metrics.

At 240, a score is calculated for the attribute based upon the metric. The score may be calculated as a simple ratio of a number of lists associated with the attribute and a number of web pages generated for purposes of identifying lists. In some instances, such a score may classify a host that appears in the set of resources as the one and only time it was crawled as malicious. Therefore, in some embodiments, the score may be calculated using one or more algorithms. For example, the score may be calculated using a Wilson score interval to determine a conservative score indicating malicious activity. The score may be calculated as a lower bound of the Wilson interval.

In some examples, a weight may be applied to the score based on one or more factors. For example, the weight may be an exponential decay factor (e.g., calculating the score may be further based upon an amount of time since the attribute has been included in a blacklist sequence). The score may be weighted based on the one or more factors. For example, the score may be multiplied by the decay factor. The exponential decay factor may be defined as a specific number of days during which a network asset was crawled and an when an malicious incident was detected for an indicator (e.g., a network asset). For example, the decay factor may be 7 days. A different weight for the decay factor may be applied to the score based on consideration of the decay factor. In the last example, when the difference between the last time a network asset was crawled and the last time network asset was detected as being associated with malicious incident was 7 days, the weight may be 0.5, or half of the score. Thus, a score may be modified based on application of a weight.

At step 250, the attribute is classified as malicious based upon the score. For example, the score may be compared to a threshold to determine whether the threshold is satisfied (e.g., exceeded or not exceeded). An indicator may be associated with a malicious incident for the set of resources for the indicator when the threshold is satisfied. For example, if the score is 15 or higher, a malicious incident may be associated with the set of resources for the score based on the indicator.

In some embodiments, a score may be based on a scale of 0 to 100, such that the score indicates a measure of maliciousness. If the score is 25, then the score may be indicative that the resources for which the score is determined are identified with an indicator such as a host or a domain that is malicious 25% of the time. However, the score may indicate, for example, that if we crawled the host 100 more times, at least 25 out of 100 times we would flag it as malicious. The score can also means that the last time we crawled it, it was flagged. Using the Wilson interval, the score may provide a confidence indication of 99%.

At 260, a URI associated with the attribute may be identified in the list. At 270, an indication that the identified URI is associated with malicious behavior is output. In some examples, outputting may include adding the identified URI to an accomplice list, which is used to identify one or more URIs that have been determined to be associated with malicious behavior.

In some embodiments, the techniques disclosed herein can be used to detect malicious resources (e.g., URLs), tracking IDs, social media profile usernames, headers, cookies, web components and other indicators. By analyzing the probability a URL should be blacklisted given the hostname and the probability of the hostname given an attribute, the hostname may be marginalized to estimate the number of times an attribute appeared in a blacklist sequence. The calculation may be based on a time interval (e.g., a decay factor) between when the host was blacklisted and when the attribute was detected on the host overlap.

In some examples, a single URI may be associated with one or more scores (e.g., one per attribute). In certain examples, the score may be a maximum score of the one or more scores. In other examples, a Bayesian network model can be generated to take into account multiple scores at the same time. The Bayesian Network model may include probability tables that can be learned using a variety of Machine learning algorithms or entered in manually.

A process may include receiving a blacklist sequence. The blacklist sequence may include multiple Uniform Resource Identifiers (URIs), each URI called when rendering a first web page. In the blacklist sequence, a first URI may be determined to be malicious and a second URI may not be determined to be malicious.

In one illustrative example, the blacklist sequence may be generated by a web crawler. The web crawler may receive a request to render a web page corresponding to a URI. The web crawler may retrieve a document for rendering the web page using the URI. The web crawler may then parse the document, causing one or more additional URIs to be called. At some point, a first URI called by the web crawler may be determined to be malicious. In response, the web crawler may cause the blacklist sequence to include each URI called while parsing the document before the first URI is called. When the first URI is the URI corresponding to the web page, every URI called to render the web page may be included in the blacklist sequence. In some examples, when the first URI is determined to be malicious, each other URI in the blacklist sequence might not have been determined to be malicious.

In some examples, the blacklist sequence may be a set of resources that have been identified as malicious ("blacklisted") for possible malicious activity. The set of resources may include, without limitation, an electronic document, an application, a web page, a file, data, or combinations thereof. Each of the resources may be identified as a location, such as a uniform resource identifier (URI).

The set of resources may be identified as part of a sequence of resources that are malicious either by detecting malicious behavior with respect to the resource. For example, the set of resources may be URLs in a blacklist sequence of resources. Each in the set of resources may be detected as having malicious behavior at a web page accessible by the URL of the resource. Each in the set of resources may be detected as having malicious behavior based on reputation (e.g., a message from a system) provided by a provider of access to the resource. Each of the resources may be identified as malicious by identification of a relationship with other resources in the set. For example, the set of resources may be identified as being malicious based on a process implemented using techniques disclosed in U.S. Non-Provisional application Ser. No. 15/787,654 entitled "HOST PAIR DETECTION" and filed on Oct. 18, 2017. The set of resources may be identified as related to a network asset. For example, a host of each in the set of resources may be identified as having a relationship.

The process may also include identifying an attribute associated with the second URI. The second URI may be a URI of the plurality of URIs that is not determined to be malicious. Examples of an attribute include a host, a domain, an Internet Protocol (IP) address, or an element included in a document used to render a web page. The element may be an active/dynamic element or a non-active/static element. An example of an element include a function, a tracking ID, or a social media profile username.

The process may also include identifying a first number. The first number may include a number of blacklist sequences that include a URI that is associated with the attribute. The process may also include identifying a second number. The second number may include a number of web pages rendered that (1) cause a URI associated with the attribute to be called and (2) did not call a URI determined to be malicious.

The process may also include calculating a score for the attribute based upon the first number and the second number. The score may be calculated as a simple ratio of the first number and the second number. In some instances, such a score may classify a host that appears in the set of resources as the one and only time it was crawled as malicious. Therefore, in some embodiments, the score may be calculated using one or more algorithms. For example, the score may be calculated using a Wilson score interval to determine a conservative score indicating malicious activity. The score may be calculated as a lower bound of the Wilson interval.

In some examples, a weight may be applied to the score based on one or more factors. For example, the weight may be an exponential decay factor (e.g., calculating the score may be further based upon an amount of time since the attribute has been included in a blacklist sequence). The score may be weighted based on the one or more factors. For example, the score may be multiplied by the decay factor. The exponential decay factor may be defined as a specific number of days during which a network asset was crawled and an when an malicious incident was detected for an indicator (e.g., a network asset). For example, the decay factor may be 7 days. A different weight for the decay factor may be applied to the score based on consideration of the decay factor. In the last example, when the difference between the last time a network asset was crawled and the last time network asset was detected as being associated with malicious incident was 7 days, the weight may be 0.5, or half of the score. Thus, a score may be modified based on application of a weight.

The process may further include determining the attribute is malicious based upon the score. For example, the score may be compared to a threshold to determine whether the threshold is satisfied (e.g., exceeded or not exceeded). An indicator may be associated with a malicious incident for the set of resources for the indicator when the threshold is satisfied. For example, if the score is 15 or higher, a malicious incident may be associated with the set of resources for the score based on the indicator.

In some embodiments, a score may be based on a scale of 0 to 100, such that the score indicates a measure of maliciousness. If the score is 25, then the score may be indicative that the resources for which the score is determined are identified with an indicator such as a host or a domain that is malicious 25% of the time. However, the score may indicate, for example, that if we crawled the host 100 more times, at least 25 out of 100 times we would flag it as malicious. The score can also means that the last time we crawled it, it was flagged. Using the Wilson interval, the score may provide a confidence indication of 99%.

The process may further include in response to determining that the attribute is malicious, outputting an indication that the second URI is malicious.

In some embodiments, the techniques disclosed herein can be used to detect malicious resources (e.g., URLs), tracking IDs, social media profile usernames, headers, cookies, web components and other indicators. By analyzing the probability a URL should be blacklisted given the hostname and the probability of the hostname given an attribute, the hostname may be marginalized to estimate the number of times an attribute appeared in a blacklist sequence. The calculation may be based on a time interval (e.g., a decay factor) between when the host was blacklisted and when the attribute was detected on the host overlap.

In some examples, a single URI may be associated with one or more scores (e.g., one per attribute). In certain examples, the score may be a maximum score of the one or more scores. In other examples, a Bayesian network model can be generated to take into account multiple scores at the same time. The Bayesian Network model may include probability tables that can be learned using a variety of Machine learning algorithms or entered in manually. The process described here may include similar limitations to that described in FIG. 2. Some steps may be switched out, combined, and modified in the process here and the process in FIG. 2. Some definitions used in FIG. 2 may be used for the process here (and vice versa).

III. Computer Systems for a Network Analytic System and a Client System

Various operations disclosed herein may be implemented on computer systems, which may be of generally conventional design. FIG. 4 shows a simplified block diagram of a representative computing system 402 and client computing system 404 usable to implement certain embodiments of the present disclosure. In various embodiments, computing system 402 or similar systems may implement network analytic system 120, or any other computing system disclosed herein or portions thereof. Client computing system 404 or similar systems may implement client system 104, or other client systems disclosed herein.

Computing system 402 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 402 may include processing subsystem 410. Processing subsystem 410 may communicate with a number of peripheral systems via bus subsystem 470. These peripheral systems may include I/O subsystem 430, storage subsystem 468, and communications subsystem 440.

Bus subsystem 470 provides a mechanism for letting the various components and subsystems of server computing system 404 communicate with each other as intended. Although bus subsystem 470 is shown schematically as a single bus, alternative embodiments of the bus subsystem may utilize multiple buses. Bus subsystem 470 may form a local area network that supports communication in processing subsystem 410 and other components of server computing system 420. Bus subsystem 470 may be implemented using various technologies including server racks, hubs, routers, etc. Bus subsystem 470 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 430 may include devices and mechanisms for inputting information to computing system 402 and/or for outputting information from or via computing system 402. In general, use of the term "input device" is intended to include all possible types of devices and mechanisms for inputting information to computing system 402. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 402 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 410 controls the operation of computing system 402 and may comprise one or more processing units 412, 414, etc. A processing unit may include one or more processors, including single core processor or multicore processors, one or more cores of processors, or combinations thereof. In some embodiments, processing subsystem 410 may include one or more special purpose co-processors such as graphics processors, digital signal processors (DSPs), or the like. In some embodiments, some or all of the processing units of processing subsystem 410 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 422, 424. Any type of processors in any combination may be included in processing unit(s) 412, 414.

In some embodiments, processing subsystem 410 may be implemented in a modular design that incorporates any number of modules (e.g., blades in a blade server implementation). Each module may include processing unit(s) and local storage. For example, processing subsystem 410 may include processing unit 412 and corresponding local storage 422, and processing unit 414 and corresponding local storage 424.

Local storage 422, 424 may include volatile storage media (e.g., conventional DRAM, SRAM, SDRAM, or the like) and/or non-volatile storage media (e.g., magnetic or optical disk, flash memory, or the like). Storage media incorporated in local storage 422, 424 may be fixed, removable or upgradeable as desired. Local storage 422, 424 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 412, 414 need at runtime. The ROM may store static data and instructions that are needed by processing unit(s) 412, 414. The permanent storage device may be a non-volatile read-and-write memory device that may store instructions and data even when a module including one or more processing units 412, 414 and local storage 422, 424 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 422, 424 may store one or more software programs to be executed by processing unit(s) 412, 414, such as an operating system and/or programs implementing various server functions such as functions of Network analytic system 120, or any other server(s) associated with Network analytic system 120. "Software" refers generally to sequences of instructions that, when executed by processing unit(s) 412, 414 cause computing system 402 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 412, 414. In some embodiments the instructions may be stored by storage subsystem 468 (e.g., computer readable storage media). In various embodiments, the processing units may execute a variety of programs or code instructions and may maintain multiple concurrently executing programs or processes. At any given time, some or all of the program code to be executed may be resident in local storage 422, 424 and/or in storage subsystem including potentially on one or more storage devices. Software may be implemented as a single program or a collection of separate programs or program modules that interact as desired. From local storage 422, 424 (or non-local storage described below), processing unit(s) 412, 414 may retrieve program instructions to execute and data to process in order to execute various operations described above.

Storage subsystem 468 provides a repository or data store for storing information that is used by computing system 402. Storage subsystem 468 provides a tangible non-transitory computer-readable storage medium for storing the basic programming and data constructs that provide the functionality of some embodiments. Software (programs, code modules, instructions) that when executed by processing subsystem 410 provide the functionality described above may be stored in storage subsystem 468. The software may be executed by one or more processing units of processing subsystem 410. Storage subsystem 468 may also provide a repository for storing data used in accordance with the present disclosure.

Storage subsystem 468 may include one or more non-transitory memory devices, including volatile and non-volatile memory devices. As shown in FIG. 4, storage subsystem 468 includes a system memory 460 and a computer-readable storage media 452. System memory 460 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 402, such as during start-up, may typically be stored in the ROM. The RAM typically contains data and/or program modules that are presently being operated and executed by processing subsystem 410. In some implementations, system memory 460 may include multiple different types of memory, such as static random access memory (SRAM) or dynamic random access memory (DRAM). Storage subsystem 468 may be based on magnetic, optical, semiconductor, or other data storage media. Direct attached storage, storage area networks, network-attached storage, and the like may be used. Any data stores or other collections of data disclosed herein as being produced, consumed, or maintained by a service or server may be stored in storage subsystem 468.

By way of example, and not limitation, as depicted in FIG. 4, system memory 460 may store application programs 462, which may include client applications, Web browsers, mid-tier applications, relational database management systems (RDBMS), etc., program data 464, and one or more operating systems 466. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 452 may store programming and data constructs that provide the functionality of some embodiments. Software (programs, code modules, instructions) that when executed by processing subsystem 410 a processor provide the functionality described above may be stored in storage subsystem 468. By way of example, computer-readable storage media 452 may include non-volatile memory such as a hard disk drive, a magnetic disk drive, an optical disk drive such as a CD ROM, DVD, a Blu-Ray® disk, or other optical media. Computer-readable storage media 452 may include, but is not limited to, Zip® drives, flash memory cards, universal serial bus (USB) flash drives, secure digital (SD) cards, DVD disks, digital video tape, and the like. Computer-readable storage media 452 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 452 may provide storage of computer-readable instructions, data structures, program modules, and other data for computing system 402.

In certain embodiments, storage subsystem 468 may also include a computer-readable storage media reader 450 that may further be connected to computer-readable storage media 452. Together and, optionally, in combination with system memory 460, computer-readable storage media 452 may comprehensively represent remote, local, fixed, and/or removable storage devices plus storage media for storing computer-readable information.

In certain embodiments, computing system 402 may provide support for executing one or more virtual machines. Computing system 402 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 402. Accordingly, multiple operating systems may potentially be run concurrently by computing system 402. Each virtual machine generally runs independently of the other virtual machines.

Communication subsystem 440 provides an interface to other computer systems and networks. Communication subsystem 440 serves as an interface for receiving data from and transmitting data to other systems from computing system 402. For example, communication subsystem 440 may enable computing system 402 to establish a communication channel to one or more client computing devices via the Internet for receiving and sending information from and to the client computing devices.

Communication subsystem 440 may support both wired and/or wireless communication protocols. For example, in certain embodiments, communication subsystem 440 may include radio frequency (RF) transceiver components for accessing wireless voice and/or data networks (e.g., using cellular telephone technology, advanced data network technology, such as 3G, 2G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 440 may provide wired network connectivity (e.g., Ethernet) in addition to or instead of a wireless interface.

Communication subsystem 440 may receive and transmit data in various forms. For example, in some embodiments, communication subsystem 440 may receive input communication in the form of structured and/or unstructured data feeds, event streams, event updates, and the like. For example, communication subsystem 440 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 440 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 440 may also be configured to output the structured and/or unstructured data feeds, event streams, event updates, and the like to one or more databases that may be in communication with one or more streaming data source computers coupled to computing system 402.

Communication subsystem 440 may provide a communication interface 442, e.g., a WAN interface, which may provide data communication capability between the local area network (bus subsystem 470) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 402 may operate in response to requests received via communication interface 442. Further, in some embodiments, communication interface 442 may connect computing systems 402 to each other, providing scalable systems capable of managing high volumes of activity. Conventional or other techniques for managing server systems and server farms (collections of server systems that cooperate) may be used, including dynamic resource allocation and reallocation.

Computing system 402 may interact with various user-owned or user-operated devices via a wide-area network such as the Internet. An example of a user-operated device is shown in FIG. 4 as client computing system 402. Client computing system 404 may be implemented, for example, as a consumer device such as a smart phone, other mobile phone, tablet computer, wearable computing device (e.g., smart watch, eyeglasses), desktop computer, laptop computer, and so on.

For example, client computing system 404 may communicate with computing system 402 via communication interface 442. Client computing system 404 may include conventional computer components such as processing unit(s) 482, storage device 484, network interface 480, user input device 486, and user output device 488. Client computing system 404 may be a computing device implemented in a variety of form factors, such as a desktop computer, laptop computer, tablet computer, smart phone, other mobile computing device, wearable computing device, or the like.

Processing unit(s) 482 and storage device 484 may be similar to processing unit(s) 412, 414 and local storage 422, 424 described above. Suitable devices may be selected based on the demands to be placed on client computing system 404; for example, client computing system 404 may be implemented as a "thin" client with limited processing capability or as a high-powered computing device. Client computing system 404 may be provisioned with program code executable by processing unit(s) 482 to enable various interactions with computing system 402 of a message management service such as accessing messages, performing actions on messages, and other interactions described above. Some client computing systems 404 may also interact with a messaging service independently of the message management service.

Network interface 480 may provide a connection to a wide area network (e.g., the Internet) to which communication interface 440 of computing system 402 is also connected. In various embodiments, network interface 480 may include a wired interface (e.g., Ethernet) and/or a wireless interface implementing various RF data communication standards such as Wi-Fi, Bluetooth, or cellular data network standards (e.g., 3G, 2G, LTE, etc.).

User input device 486 may include any device (or devices) via which a user may provide signals to client computing system 404; client computing system 404 may interpret the signals as indicative of particular user requests or information. In various embodiments, user input device 486 may include any or all of a keyboard, touch pad, touch screen, mouse or other pointing device, scroll wheel, click wheel, dial, button, switch, keypad, microphone, and so on.

User output device 488 may include any device via which client computing system 404 may provide information to a user. For example, user output device 488 may include a display to display images generated by or delivered to client computing system 404. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 488 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 412, 414 and 482 may provide various functionality for computing system 402 and client computing system 404, including any of the functionality disclosed herein as being performed by a server or client, or other functionality associated with message management services.

It will be appreciated that computing system 402 and client computing system 404 are illustrative and that variations and modifications are possible. Computer systems used in connection with embodiments of the present disclosure may have other capabilities not specifically described here. Further, while computing system 402 and client computing system 404 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While the disclosure has been described with respect to specific embodiments, one skilled in the art will recognize that numerous modifications are possible. For instance, although specific processes are disclosed herein, other processes may be implemented. Embodiments of the disclosure may be realized using a variety of computer systems and communication technologies including but not limited to specific examples disclosed herein.

Embodiments of the present disclosure may be realized using any combination of dedicated components and/or programmable processors and/or other programmable devices. The various processes disclosed herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method, comprising:
   creating a uniform resource identifier (URI) list, which includes a plurality of URIs that are used to render a web page;
   identifying an attribute associated with the web page;
   identifying a number of web pages that are rendered and that cause a first URI associated with the attribute to be called without calling a second URI that is determined to be malicious;
   calculating a score for the attribute based at least on the number of the web pages that are rendered and that cause the first URI associated with the attribute to be called without calling the second URI that is determined to be malicious;
   classifying the attribute as malicious based at least on the score;
   determining that an identified URI in the URI list is associated with the attribute; and
   as a result of determining that the identified URI in the URI list is associated with the attribute, performing the following operations:
   creating a blacklist incident for the identified URI; and
   performing a security action with regard to the identified URI.

2. The method of claim 1, further comprising:
   using a statistical model to assign a plurality of reputation scores to the plurality of URIs in the URI list;
   wherein the blacklist incident is created for the identified URI further as a result of a reputation score assigned to the identified URI exceeding a threshold value.

3. The method of claim 1, wherein performing a security action comprises:
   informing a user that the identified URI is malicious.

4. The method of claim 1, wherein performing a security action comprises:

sending the identified URI to a system that removes code that causes the identified URI to be called.

5. The method of claim 1, further comprising:
identifying indirect connections from one-time-use hosts that redirect to the web page.

6. The method of claim 1, wherein creating the blacklist incident comprises:
adding the blacklist incident to a blacklist sequence that is segmented based on profiles of blacklist incidents.

7. The method of claim 1, wherein creating the blacklist incident comprises:
adding the blacklist incident to a blacklist sequence; and wherein the method further comprises:
identifying a social media username that is malicious by identifying blacklisted URIs in the blacklist sequence that are associated with the social media username.

8. The method of claim 1, further comprising:
applying an exponential decay factor to the reputation score assigned to the identified URI, the exponential decay factor based at least on an amount of time since a host or domain associated with the identified URI was blacklisted.

9. The method of claim 1, further comprising:
applying an exponential decay factor to the reputation score assigned to the identified URI, the exponential decay factor based at least on an amount of time since a blacklisted host or domain associated with the identified URI was crawled.

10. A system comprising:
a memory; and
one or more processors coupled to the memory, the one or more processors configured to:
create a uniform resource identifier (URI) list, which includes a plurality of URIs that are used to render a web page;
identify an attribute associated with the web page;
identify a number of web pages that are rendered and that cause a first URI associated with the attribute to be called without calling a second URI that is determined to be malicious;
calculate a score for the attribute based at least on the number of the web pages that are rendered and that cause the first URI associated with the attribute to be called without calling the second URI that is determined to be malicious;
classify the attribute as malicious based at least on the score;
determine that an identified URI in the URI list is associated with the attribute; and
as a result of a determination that the identified URI in the URI list is associated with the attribute:
create a blacklist incident for the identified URI; and
perform a security action with regard to the identified URI.

11. The system of claim 10, wherein the one or more processors are further configured to:
use a statistical model to assign a plurality of reputation scores to the plurality of URIs in the URI list; and
wherein the one or more processors are configured to:
create the blacklist incident for the identified URI further as a result of a reputation score assigned to the identified URI exceeding a threshold value.

12. The system of claim 10, wherein the one or more processors are configured to:
inform a user that the identified URI is malicious.

13. The system of claim 10, wherein the one or more processors are configured to:
send the identified URI to a system that removes code that causes the identified URI to be called.

14. The system of claim 10, wherein the one or more processors are further configured to:
identify indirect connections from one-time-use hosts that redirect to the web page.

15. The system of claim 10, wherein the one or more processors are configured to:
add the blacklist incident to a blacklist sequence that is segmented based on profiles of blacklist incidents.

16. The system of claim 10, wherein the one or more processors are configured to:
create the blacklist incident by adding the blacklist incident to a blacklist sequence; and
identify a social media username that is malicious by identifying blacklisted URIs in the blacklist sequence that are associated with the social media username.

17. The system of claim 10, wherein the one or more processors are further configured to:
apply an exponential decay factor to the reputation score assigned to the identified URI, the exponential decay factor based at least on an amount of time since a host or domain associated with the identified URI was blacklisted.

18. The system of claim 10, wherein the one or more processors are further configured to:
apply an exponential decay factor to the reputation score assigned to the identified URI, the exponential decay factor based at least on an amount of time since a blacklisted host or domain associated with the identified URI was crawled.

19. A computer program product comprising a non-transitory computer-readable storage medium having instructions recorded thereon for enabling a processor-based system to perform operations, the operations comprising:
creating a uniform resource identifier (URI) list, which includes a plurality of URIs that are used to render a web page;
identifying an attribute associated with the web page;
identifying a number of web pages that are rendered and that cause a first URI associated with the attribute to be called without calling a second URI that is determined to be malicious;
calculating a score for the attribute based at least on the number of the web pages that are rendered and that cause the first URI associated with the attribute to be called without calling the second URI that is determined to be malicious;
classifying the attribute as malicious based at least on the score;
determining that an identified URI in the URI list is associated with the attribute; and
as a result of determining that the identified URI in the URI list is associated with the attribute:
creating a blacklist incident for the identified URI; and
performing a security action with regard to the identified URI.

20. The computer program product of claim 19, wherein the operations further comprise:
applying an exponential decay factor to the reputation score assigned to the identified URI, the exponential decay factor based at least on at least one of:

an amount of time since a host or domain associated with the identified URI was blacklisted; or an amount of time since a blacklisted host or domain associated with the identified URI was crawled.

\* \* \* \* \*